(12) United States Patent
Kikuchi

(10) Patent No.: US 8,208,211 B2
(45) Date of Patent: Jun. 26, 2012

(54) MAGNETIC TRANSFER DEVICE AND MAGNETIC TRANSFER METHOD

(75) Inventor: Hiroto Kikuchi, Nagano (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 12/831,663

(22) Filed: Jul. 7, 2010

(65) Prior Publication Data

US 2011/0013303 A1    Jan. 20, 2011

(30) Foreign Application Priority Data

Jul. 15, 2009   (JP) .................................. 2009-166785

(51) Int. Cl.
*G11B 5/86* (2006.01)
(52) U.S. Cl. ................. 360/17; 360/15; 360/16; 360/48
(58) Field of Classification Search .................. None
See application file for complete search history.

(56) References Cited

U.S. PATENT DOCUMENTS

| | | | | |
|---|---|---|---|---|
| 6,577,459 B1 * | 6/2003 | Komatsu et al. | ................. | 360/15 |
| 6,594,099 B2 * | 7/2003 | Serizawa | ........................ | 360/66 |
| 6,646,820 B1 * | 11/2003 | Ishida et al. | .................... | 360/17 |
| 6,731,446 B2 * | 5/2004 | Ikeda et al. | ...................... | 360/59 |
| 6,741,431 B2 * | 5/2004 | Funayama et al. | ............ | 360/321 |
| 6,747,822 B2 * | 6/2004 | Saito | .............................. | 360/17 |
| 6,747,823 B2 * | 6/2004 | Saito et al. | ...................... | 360/17 |
| 6,813,105 B2 * | 11/2004 | Takano | ........................... | 360/17 |
| 6,885,513 B1 * | 4/2005 | Baker | .............................. | 360/17 |
| 6,950,254 B2 * | 9/2005 | Suzuki et al. | .................... | 360/17 |
| 6,977,785 B2 * | 12/2005 | Nakamura et al. | ............... | 360/17 |
| 7,369,337 B2 * | 5/2008 | Fujisawa | ........................ | 360/17 |
| 7,420,757 B2 * | 9/2008 | Kamatani et al. | ............... | 360/17 |
| 2002/0034107 A1 | 3/2002 | Saito | | |
| 2002/0080507 A1 | 6/2002 | Taniguchi et al. | | |
| 2003/0184895 A1 | 10/2003 | Niitsuma et al. | | |
| 2006/0072227 A1 * | 4/2006 | Aoki et al. | ...................... | 360/17 |
| 2007/0002480 A1 | 1/2007 | Fujinami et al. | | |

FOREIGN PATENT DOCUMENTS

| | | |
|---|---|---|
| JP | 2002-083421 A | 3/2002 |
| JP | 2002-237031 A | 8/2002 |
| JP | 2003-242635 A | 8/2003 |
| JP | 2007-012142 A | 1/2007 |

* cited by examiner

*Primary Examiner* — Dismery Mercedes
(74) *Attorney, Agent, or Firm* — Rabin & Berdo, P.C.

(57) ABSTRACT

A magnetic transfer device and method are provided. A magnetic field generating structure comprises a pair of permanent magnets connected to a return yoke. Respective magnetic poles of the magnets, of a different polarity from one another, oppose each other with a conjoined body disposed therebetween. The magnetic field generating structure is moved from a position at an outer periphery of the conjoined body, to a position at an inner periphery of the conjoined body, and then moved from the position at the inner periphery across the conjoined body toward the outer periphery, to a position outside of the conjoined body. The return yoke is positioned at a radially more outward position, toward the outer periphery, than are the permanent magnets. The movement of the magnetic field generating structure is carried out while maintaining a constant distance from the rotating conjoined body.

10 Claims, 5 Drawing Sheets

MAGNETIC TRANSFER DEVICE AND MAGNETIC TRANSFER METHOD

CROSS-REFERENCE TO RELATED APPLICATION

This application claims priority under 35 U.S.C. §119 from Japanese Patent Application 2009-166785, filed Jul. 15, 2009, the entirety of which is incorporated herein by reference.

BACKGROUND OF THE INVENTION

1. Field of the Invention

The present invention relates to a magnetic transfer device and a magnetic transfer method for transferring preformat information to a magnetic recording layer of a perpendicular magnetic recording medium, the magnetic transfer being carried out by making close contact between a surface of transfer information pattern of a master disk that has a transfer information pattern of ferromagnetic material corresponding to the preformat information to be transferred, and a recording surface of the perpendicular magnetic recording medium that has a magnetic recording layer, and by applying a transferring magnetic field in a direction perpendicular to the surface of close contact.

2. Description of the Related Art

Common hard disk drive (HDD) devices perform recording and reproduction of data by a magnetic head flying over a magnetic recording medium (a hard disk) in a flying height of about 10 nm. Information of bits on the magnetic recording medium is stored on data tracks aligned concentrically. The magnetic head is positioned on the data track to perform recording and reproduction of data. Servo data for the positioning is recorded on the magnetic recording medium. The servo data is recorded on a track concentric to the data track with a predetermined angular interval.

The servo information is generally recorded using a magnetic head. However, a recent increase in recording tracks has caused problems of increase in write time and degradation of efficiency in HDD production.

In order to cope with these problems, a method has been proposed in which the whole of the servo information is collectively recorded on the magnetic recording medium by means of a magnetic transfer technique using a master disk carrying the servo information instead of writing the servo information using a magnetic head.

Figure 7:
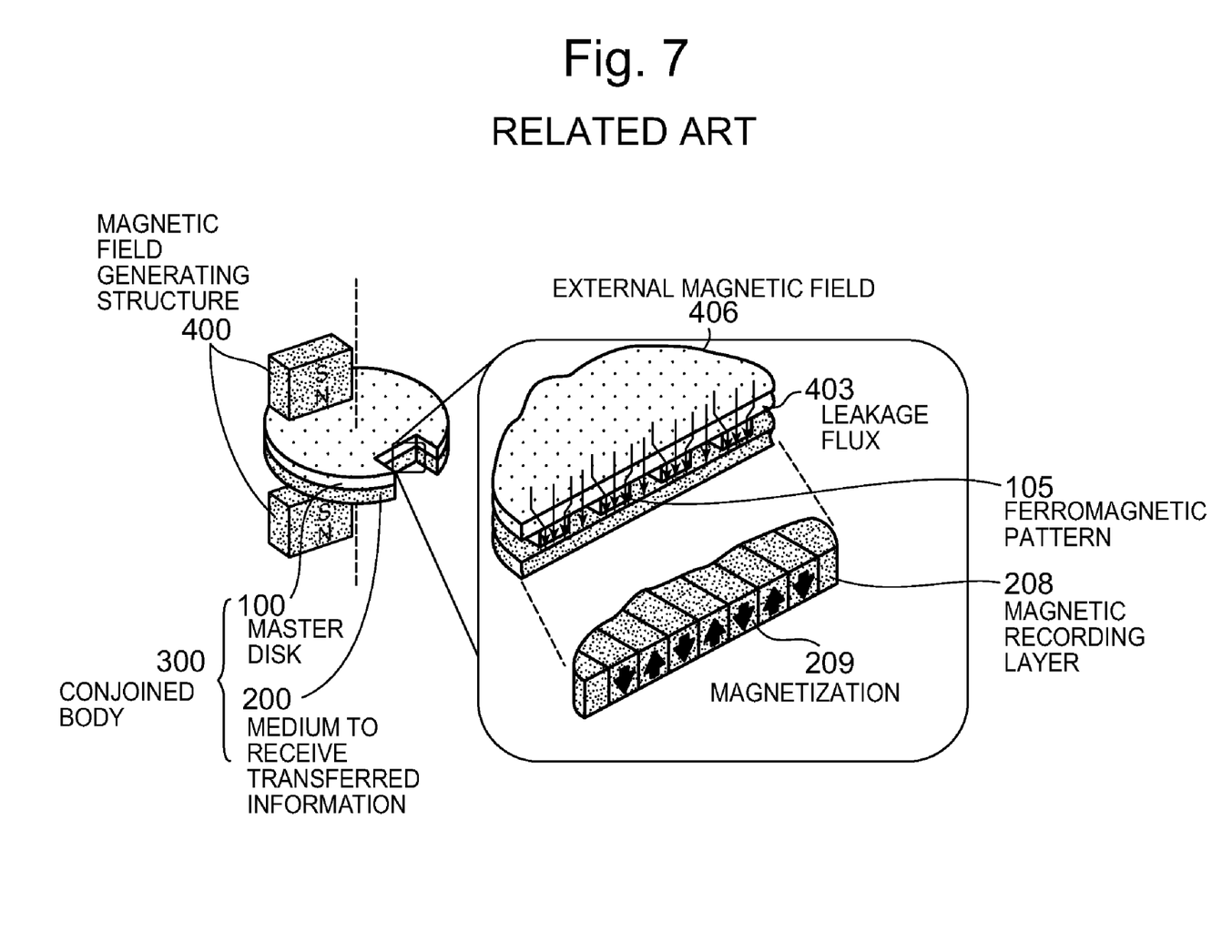
FIG. 7 is a perspective view illustrating a principle of magnetic transfer to a perpendicular magnetic recording medium.

Japanese Unexamined Patent Application Publication No. 2002-083421 (hereafter, "Patent Document 1"), for example, discloses a method in which a master disk having a servo pattern formed of a ferromagnetic material is used, and preformat information including the servo information on the master disk is transferred to a perpendicular magnetic recording medium FIG. 7 is a perspective view illustrating a principle of magnetic transfer to a perpendicular magnetic recording medium, with an enlarged view of a conjoined body 300 composed of a master disk 100 and a magnetic recording medium 200 to receive transferred information.

Referring to FIG. 7, a pattern 105 of protrusions and recesses is formed of a ferromagnetic material (preferably a soft magnetic material) on a surface of the master disk 100. The pattern corresponds to preformat information to be transferred. The surface pattern of the master disk 100 is placed into close contact with a recording surface of a magnetic recording medium 200 having a magnetic recording layer 208 to which the information pattern is to be transferred. An external magnetic field 406 as a transferring magnetic field is applied by a magnetic field generating structure 400 having a permanent magnet or the like. Leakage flux 403 penetrates into the medium 200 to generate magnetization 209 in the magnetic recording layer 208 of the medium 200. Thus, magnetic signals along the ferromagnetic pattern 105 on the master disk 100 are transferred to the medium 200.

The magnets composing the magnetic field generating structure 400 are disposed above and under the conjoined body 300 consisting of the master disk 100 and the recording medium 200 adhered with one another, and simultaneously rotated to transfer the whole of the data at once.

Describing the magnetic transfer procedure more in detail, first the surface (a recording surface) of the medium 200 is subjected to a first magnetic field in an approximately perpendicular direction to magnetize the magnetic recording layer 208 of the medium 200 in one direction. Then, the surface of transfer information pattern of the master disk 100 is placed into close contact with the recording surface of the medium 200, and a magnetic field opposite to the first magnetic field is applied.

In this latter step, only a small amount of magnetic flux passes through the recessed parts of the ferromagnetic pattern 105 formed on the master disk 100, leaving a magnetization in the direction of the first magnetic field. The protruding parts of the ferromagnetic pattern 105 allow a large amount of magnetic flux to pass, resulting in magnetization of the protruding parts in the direction of the second magnetic field. As a consequence, a magnetization pattern is transferred corresponding to the protrusions and recesses formed on the surface of transfer information pattern of the master disk 100.

In this way of magnetic transfer, after the transfer process by rotating the magnets of the magnetic field generating structure 400, the magnets must be separated from the conjoined body 300 of the master disk 100 and the medium 200. If the magnets are separated while stopping rotation, the magnetic field becomes non-uniform when the position of the magnets is separated, causing degradation of signals. Japanese Patent No. 3396476 (hereafter, "Patent Document 2") discloses a method of applying a transfer magnetic field to avoid degradation of transfer signals at the place of separating the magnets by separating the magnets while maintaining the rotation of the magnets.

Japanese Unexamined Patent Application Publication No. 2003-242635 (hereafter, "Patent Document 3") discloses a magnetic transfer method to obtain good reproduction signals in a slave medium (a medium to receive transferred information) after the transfer process. In the method, magnetic transfer is conducted rotating the slave medium with respect to a magnetic field. After magnetic field application, the slave medium, kept in a rotating state, is moved relative to the magnetic field so that the center of the slave medium separates from the magnetic field in the radial direction. Thus, irregular magnetization in the slave medium is avoided which would occur due to leakage magnetic field of an electromagnet if the rotation is stopped during magnetic field application.

As described above, the magnetic transfer process needs to be carried out while avoiding disturbance to the transfer magnetic field when the magnets are separated. Further, the magnetic field required by magnetic transfer may result in an increase in the size of the magnetic transfer device for perpendicular magnetic recording media.

In the magnetic transfer method as shown in FIG. 7, the magnets need a length extending from the inner periphery to the outer periphery of the medium. A great attractive force acts between the pair of magnets arranged at either side of the medium. As a result, the transfer device needs to strengthen the rigidness of a part for holding the magnet, which leads to a large size of the transfer device.

Figure 3:
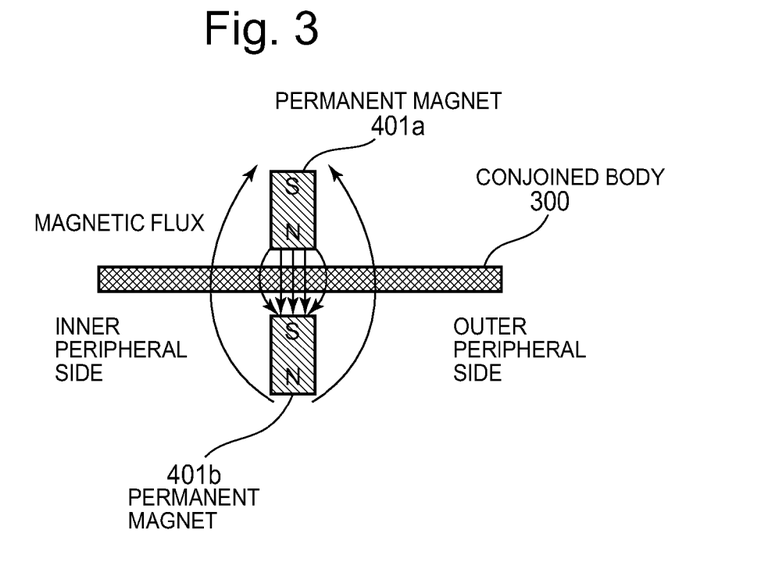
FIG. 3 illustrates the state of leakage magnetic flux in the case of no return yoke in the magnetic field generating structure.

When the transfer magnetic field is applied while moving the magnets in the radial direction as disclosed in Patent Document 3, the magnets can be short. However, in the case where a transfer magnetic field is applied to a perpendicular magnetic recording medium by a pair of magnets, a pair of magnets simply having a reduced length still generates a diffused leakage flux as shown in FIG. 3, and a transfer magnetic field cannot be applied efficiently.

SUMMARY OF THE INVENTION

In view of the above-described problems, it is an object of the present invention to provide a magnetic transfer device in which a magnetic field generating structure for generating a transfer magnetic field comprises a permanent magnet and a return yoke to effectively apply a transfer magnetic field to a conjoined body comprising a magnetic recording medium for receiving transferred information, and a master disk. With the device, a uniform magnetic transfer can be performed without disturbance to the transfer magnetic field in the process of separating the magnetic field generating structure from the conjoined body. Moreover, a load borne by a support structure for the magnetic field generating structure can be lightened, achieving a small size of the transfer device. Another object of the invention is to provide a method of magnetic transfer to achieve the above-described effects provided by the magnetic transfer device.

In order to accomplish the above objects, an embodiment of the present invention is a magnetic transfer device for transferring preformat information carried by a master disk to a magnetic recording layer of a magnetic recording medium, by causing close contact between a surface of a transfer information pattern of the master disk and a recording surface of the medium. The transfer information pattern corresponds to the preformat information to be transferred, and comprises or is formed in a ferromagnetic material. The transferring of preformat information is further accomplished by applying a transfer magnetic field in a direction perpendicular to the surfaces in close contact.

The magnetic transfer device comprises a magnetic field generating structure for applying the transfer magnetic field to a conjoined body comprising the master disk and the magnetic recording medium. The magnetic field generating structure has a pair of permanent magnets and a return yoke, the pair of permanent magnets being arranged such that respective magnetic poles of different polarity of the permanent magnets are opposing, with the conjoined body disposed between the poles. The return yoke is connected to the respective other poles of the permanent magnets.

The magnetic transfer device further comprises a means for rotating the conjoined body, and a means for moving the magnetic field generating structure relative to the conjoined body in a direction of a radius of the conjoined body, in a configuration in which the return yoke is positioned radially more outwardly than is the pair of permanent magnets, in the direction of the radius of the conjoined body. The conjoined body is interposed between the opposing magnetic poles of the pair of permanent magnets, and the magnetic field generating structure is kept at a constant distance from the surfaces in close contact.

The method according to the present invention is a method for magnetic transfer of preformat information to a magnetic recording layer of a magnetic recording medium using the magnetic recording device described previously. The method comprises starting rotation of the conjoined body, moving the magnetic field generating structure relative to the conjoined body from a position at an outer periphery of the conjoined body to a position at an inner periphery of the conjoined body, and moving the magnetic field generating structure relative to the conjoined body from the position at the inner periphery across the conjoined body toward the outer periphery to a position outside of the conjoined body.

In the method of magnetic transfer of the invention, an inequality $$Y*60/X \leq M$$

holds, wherein M is a length in millimeters (mm) in a radial direction of the magnetic field generating structure, X is a number of rotations of the conjoined body in revolutions per minute (rpm), and Y is a speed of movement of the magnetic field generating structure from the inner periphery to the outer periphery of the conjoined body. This condition ensures magnetic transfer through the whole magnetic recording medium, which may have a disk shape.

Stated in other terms, embodiments of the invention relate to a magnetic transfer device, comprising a magnetic field generating structure. The magnetic field generating structure can include a first magnet and a second magnet, and a support member to hold the first magnet and second magnet in a position opposite to each other with a medium interposed therebetween. The magnetic field generating structure can be configured to be moved in a radial direction with respect to the medium, the medium for receiving transferred information by application of a magnetic field generated by the first magnet and the second magnet, starting from a position outside of an outer periphery of the medium, moving radially toward an inner periphery of the medium, and returning to a position outside of the outer periphery of the medium.

In the magnetic transfer device, the first magnet and second magnet can be connected to a forward part of support member, and the support member can extend from the forward part to a rearward part. When the magnetic field generating structure is moved in the radial direction with respect to the medium, the forward part can be directed radially inward with respect to the medium, and the rearward part can be directed radially outward with respect to the medium. The support member can be configured to hold the first magnet and the second magnet at a substantially constant distance from the medium.

The magnetic field generating structure of the magnetic transfer device of the invention comprises a pair of permanent magnets each having a magnetic pole with a different polarity from one another and opposing each other, and a return yoke connected to the respective other poles of the permanent magnets, i.e., the magnetic poles other than the opposing magnetic poles. Therefore, diffusion of magnetic flux is reduced and the transfer magnetic field is effectively applied.

The magnetic field generating structure is moved in a configuration in which the return yoke is positioned radially more outwardly in a direction of a radius of the conjoined body, e.g., toward the outer periphery of the conjoined body, than are the permanent magnets. The transfer magnetic field is applied in this configuration by the permanent magnets to the rotating conjoined body during movement of the magnetic field generating structure from the inner periphery to the outer periphery of the conjoined body, and the magnetic field generating structure continues to move to a position outside of the conjoined body. Therefore, uneven application of the transfer magnetic field is avoided at the place the magnetic field generating structure is separated from the conjoined body.

Since uneven transfer magnetic field is avoided at the place the magnetic field generating structure is separated from the conjoined body and the transfer magnetic field is applied uniformly to the entire medium to be transferred, magnetic transfer is carried out to the magnetic medium without degradation of transferred signals. In addition, since the transfer magnetic field is applied by moving the magnetic field generating structure relative to the rotating conjoined body in the radial direction, thereby reducing diffusion of magnetic flux and effectively applying the transfer magnetic field, a cross section of the magnetic field generating structure is reduced and a load on the support structure for the magnetic field generating structure is mitigated. Therefore, reduction in a size of the magnetic transfer device is achieved.

BRIEF DESCRIPTION OF THE DRAWINGS

FIGS. 4(a) and 4(b) show a master disk used in an embodiment of the invention, in which

FIGS. 5(a) and 5(b) illustrate a chuck for holding a conjoined body of a master disk and a medium to be transferred in an embodiment of the invention, in which

DETAILED DESCRIPTION OF THE INVENTION

Some preferred embodiments according to the present invention will be described in the following with reference to accompanying drawings. In the drawings, the same or equivalent parts are given the same symbol and repeated description is omitted.

Figure 1:
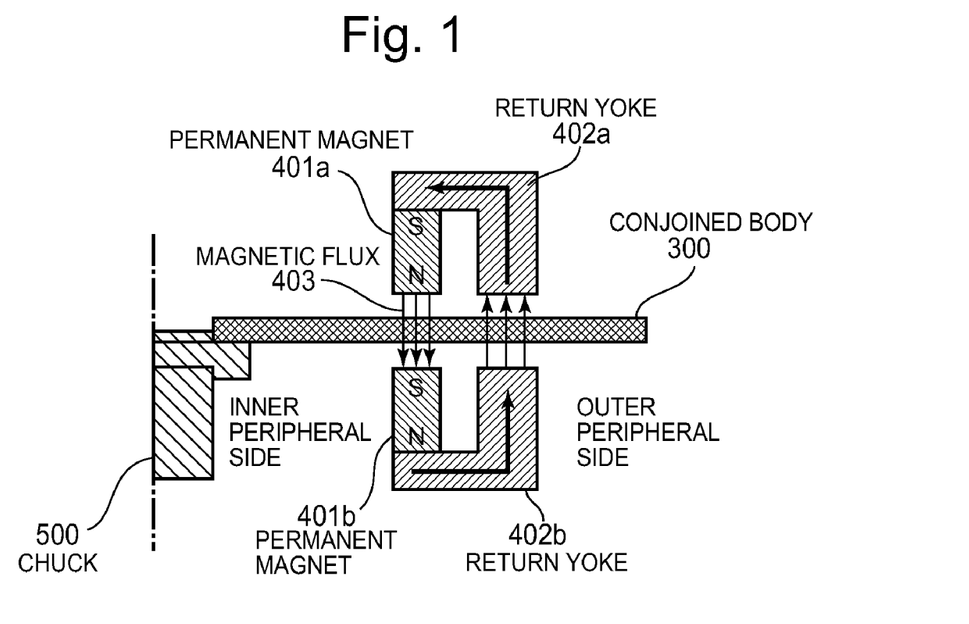
FIG. 1 is a schematic sectional view of a magnetic transfer device of an embodiment according to the present invention.

FIG. 1 is a schematic sectional view of a magnetic transfer device of an embodiment according to the present invention. In this embodiment, a magnetic field generating structure 400 (see FIG. 6), which applies a transferring magnetic field to a conjoined body composed of or including a master disk and a magnetic recording medium substantially perpendicular to the transferring magnetic field, comprises a pair of permanent magnets 401a and 401b and a pair of return yokes 402a and 402b. Each permanent magnet includes a first type of magnetic pole and a second type of magnetic pole having a different polarity from one another. The first type of magnetic pole of the permanent magnet 401a opposes the second type of magnetic pole of the permanent magnet 401b. The conjoined body 300 is interposed between permanent magnet 401a and permanent magnet 401b. An end of the return yoke 402a is in contact with the other magnetic pole (which is of the second type) of the permanent magnet 401a and an end of the return yoke 402b is in contact with the other magnetic pole (which is of the first type) of the permanent magnet 401b. The permanent magnets 401a and 401b are made of, for example, a neodymium magnet, and the return yokes 402a and 402b are made of, for example, iron.

This disposition of the return yokes 402a and 402b reduces magnetic flux diffusion as compared with a device without a return yoke (see FIG. 3). Therefore, the transfer magnetic field is effectively applied.

In a process of applying a transfer magnetic field to the conjoined body 300, the magnetic field generating structure 400 (see FIG. 6) is disposed so that the return yokes 402a and 402b are positioned at the outer peripheral side of the conjoined body relative to the permanent magnets 401a and 401b. The conjoined body 300, in rotation, is interposed between the opposing different types of magnetic poles of the permanent magnets 401a and 401b. The magnetic field generating structure 400 is moved relative to the conjoined body 300 in the radial direction of the conjoined body 300, keeping the distance from the surfaces in close contact, and therefore also keeping a distance from outer surfaces of the conjoined body 300.

Figures 4A, 4B:
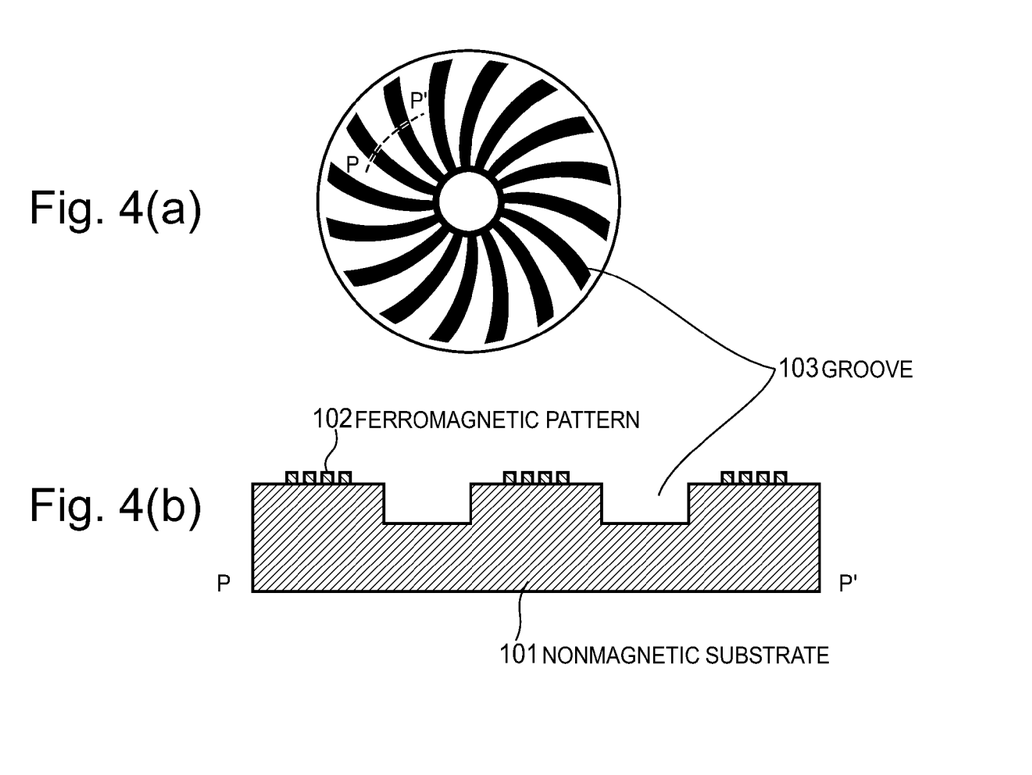
FIG. 4(a) is a schematic plan view and FIG. 4(b) is a sectional view cut along the line P-P' in FIG. 4(a)

FIGS. 4(a) and 4(b) show a master disk used in this embodiment. The master disk has a pattern 102 of protrusions of ferromagnetic material corresponding to servo information to be transferred, on a nonmagnetic substrate 101. The servo pattern is generally formed in a region extending linearly in the radial direction of the master disk. The regions are provided periodically with a predetermined angular interval. A groove 103 is formed in a recessed configuration between adjacent servo regions. The grooves continue at the inner periphery. A depth of the groove is preferably at least 10 μm.

Figure 5A:
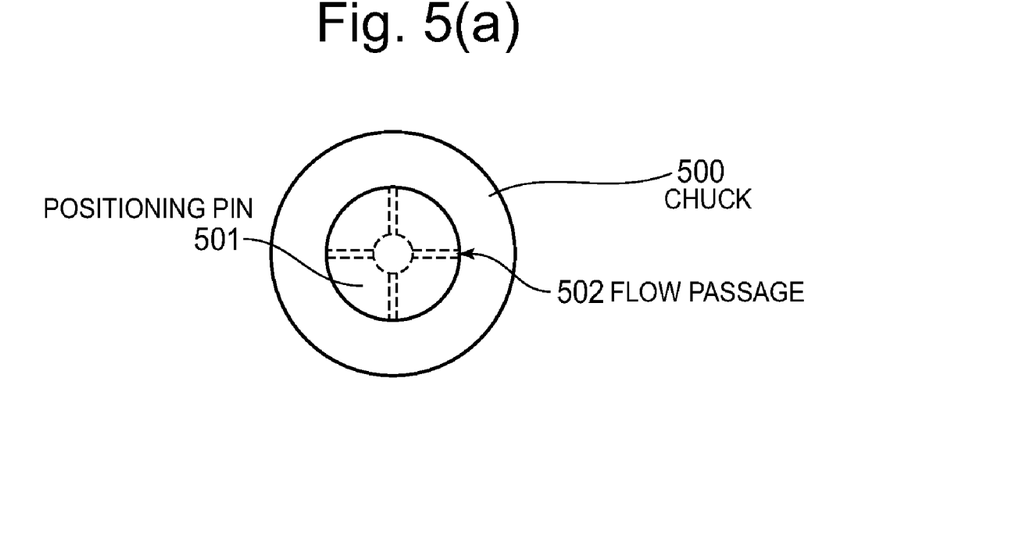
FIG. 5(a) is a schematic plan view of the chuck and FIG. 5(b) is a schematic sectional view showing the state of the chuck and the conjoined body held by the chuck.
Figure 5B:
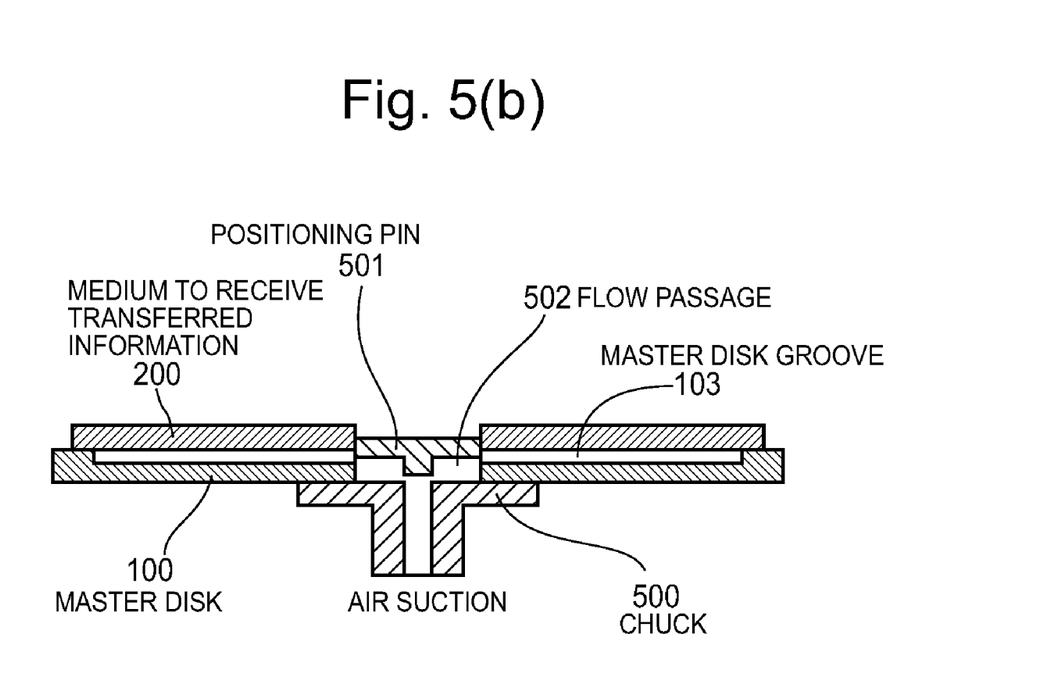

FIGS. 5(a) and 5(b) show a chuck 500 for holding the master disk and the medium to which the servo pattern is to be transferred as a conjoined body in this embodiment.

A process of holding the master disk 100 and the medium 200 to receive the transferred servo pattern as a conjoined body 300 is carried out as follows. First, the master disk 100 is put on the chuck 500 as shown in FIG. 5(b). The master disk 100 has a center hole with an inner radius the same as that of the medium 200, and is positioned at the center of rotation with a positioning pin 501. Then, the medium 200 to receive transferred information is put on the master disk 100 set on the chuck 500. The medium 200 is also positioned at the center of rotation with the positioning pin 501.

After putting the medium 200 on the master disk 100, the air is drawn out by suction through a flow pass 502 in the chuck 500, depressing the grooves 103 formed on the master disk, thereby adhering and causing close contact between the master disk 100 and the medium 200.

Although the master disk 100 and the medium 200 are brought into close contact by depressing the grooves 103 in this embodiment, a method for causing the close contact is not limited to this means.

Figure 6A:
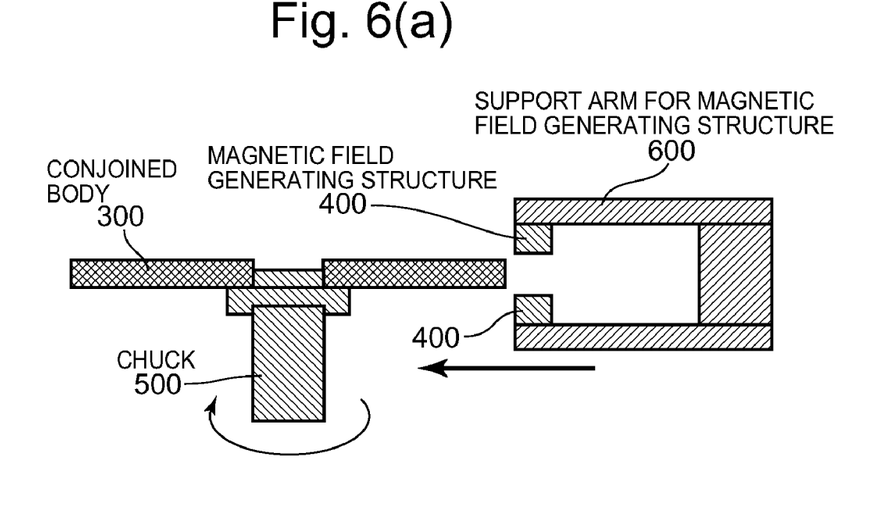
FIGS. 6(a), 6(b), and 6(c) illustrate operation of a magnetic transfer device of an embodiment according to the invention.
Figure 6B:
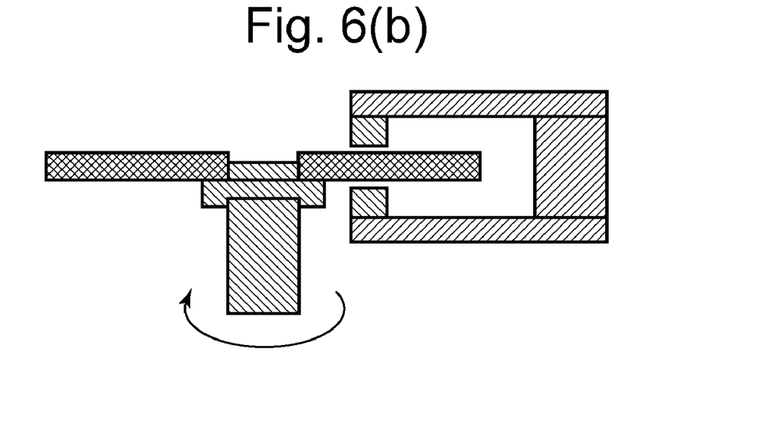
Figure 6C:
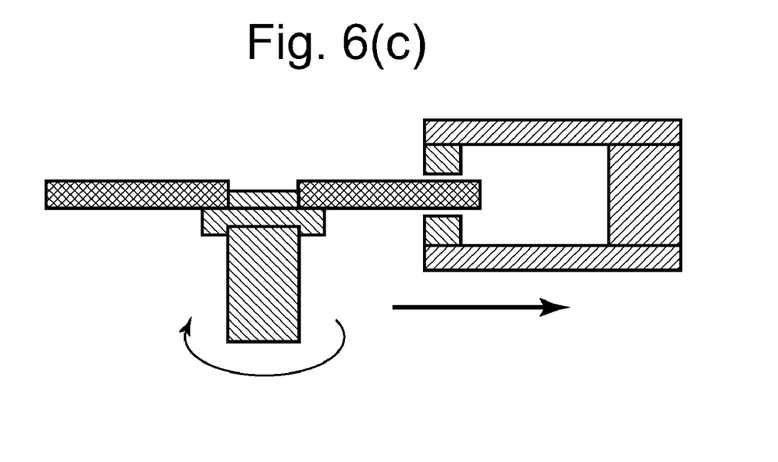

FIGS. 6(a), 6(b), and 6(c) illustrate operation of the magnetic transfer device of this embodiment. In the magnetic transfer procedure in this embodiment, first, as described above, the master disk 100 and the medium 200 to which the master disk pattern information is to be transferred are adhered and held by the chuck 500. While maintaining the adhered state, the chuck 500 is rotated by a rotating mechanism (not shown) to rotate the conjoined body 200 comprising or consisting of the master disk 100 and the medium 200.

After that, a magnetic field generating structure 400 is moved, via a support arm 600 relative to the rotating conjoined body 300, from the outer periphery towards the inner periphery of the conjoined body 300 using a moving mechanism (not shown), as indicated in FIG. 6(a). The magnetic field generating structure 400 is moved until the position where a magnetic field is applied to the innermost periphery of the transferring servo pattern formed on the master disk 100, as indicated in FIG. 6(b).

After that, the magnetic field generating structure 400 is moved from the inner periphery towards the outer periphery while maintaining the rotation of the conjoined body 300 as indicated in FIG. 6(c), and finally drawn to a position outside of the conjoined body 300 to restore the initial position of FIG. 6(a).

In the above-described procedure, the return yokes 402a and 402b are positioned farther toward the outer peripheral side of the conjoined body 300 than are the permanent magnets 401a and 401b, as shown in FIG. 1. The conjoined body 300 is interposed between the opposing magnetic poles of the permanent magnets 401a and 401b. The magnetic field generating structure 400 is moved in the direction of the radius of the conjoined body 300 relative to the conjoined body 300 while keeping a constant distance from the surfaces in close contact.

In this procedure of the embodiment, the final magnetic field application is carried out during movement of the magnetic field generating structure 400 from the inner periphery to the outer periphery of the conjoined body 300. Since the magnetic field is applied from the inner periphery sequentially towards the outer periphery, a length of the magnetic field generating structure 400 does not need to cover the entire medium from the inner periphery to the outer periphery, but can be substantially shorter than the radius of the medium to receive transferred information, thereby reducing the cross sectional area of the magnetic field generating structure 400.

Magnetic transfer is fully performed to the medium to receive transferred information provided the relation of the following inequality of formula (1) is satisfied:

$$Y*60/X \leq M \tag{1}$$

wherein

M is a length in millimeters (mm) in the radial direction of the magnetic field generating structure, X is a number of rotations of the conjoined body in revolutions per minute (rpm), and Y is a speed of movement of the magnetic field generating structure, from the inner periphery to the outer periphery.

In the formula (1), 60/X is a time in seconds (s) during one revolution of the conjoined body. Consequently, the left hand side Y*60/X is a distance through which the magnetic field generating structure moves in the time during one revolution of the conjoined body.

If this distance is greater than the radial length M of the magnetic field generating structure, a portion without magnetic field application comes into existence. Therefore, Y*60/X must be not larger than M.

As shown in FIG. 1, the magnetic field generating structure 400 comprises or is composed of the permanent magnets 401a and 401b and the return yokes 402a and 402b, and the return yokes 402a and 402b are positioned radially outside of the permanent magnets 401a and 401b, e.g., positioned nearer to the outer periphery of the conjoined body 300 (the medium). This configuration reduces scattering of the magnetic flux and applies the magnetic field effectively. If the magnetic field generating structure has a construction without a return yoke as shown in FIG. 3, the magnetic field diffuses and effective application of magnetic field cannot be implemented.

The magnetization of the medium sequentially proceeds from the inner periphery in the procedure described above. Consequently, the return yokes 402a and 402b must be positioned radially more outwardly than the permanent magnets 401a and 401b.

Through the movement of the magnetic field generating structure 400, a magnetic field is applied uniformly to the whole medium 200, completing a magnetic transfer procedure of the preformat information formed on the master disk 100.

After the completion of magnetic transfer, rotation of the conjoined body 300 is stopped. Air suction from the chuck 500 is stopped to release the medium 200 from the master disk 100. The transferred medium 200 is withdrawn, to finish the magnetic transfer process.

Figure 2:
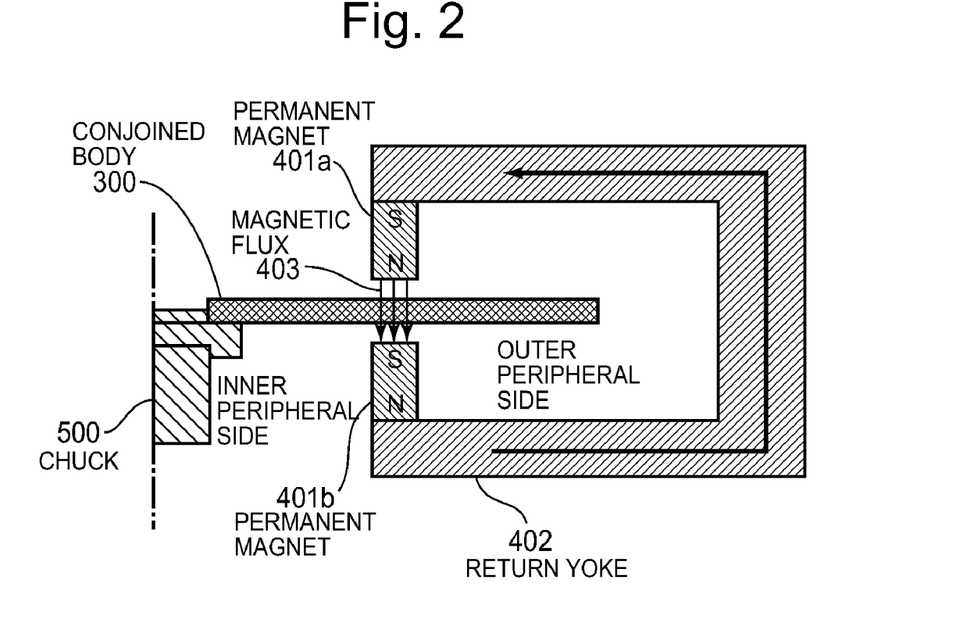
FIG. 2 is a schematic sectional view of another magnetic transfer device of an embodiment according to the present invention.

FIG. 2 is a schematic sectional view of another magnetic transfer device of an embodiment according to the present invention. A magnetic field generating structure for applying a transfer magnetic field to a conjoined body 300 of a master disk and a perpendicular magnetic recording medium in the magnetic transfer device of this embodiment comprises a pair of permanent magnets 401a and 401b and a return yoke 402 that is provided with a configuration continuing from, e.g., continuously connecting, the permanent magnet 401a to the permanent magnet 401b. In this construction, each permanent magnet includes a first type of magnetic pole and a second type of magnetic pole having different polarity from one another. The first type of magnetic pole of the permanent magnet 401a opposes the second type of magnetic pole of the magnetic pole 401b. The conjoined body 300 is interposed between the opposing poles. An end of the return yoke 402 is in contact with the other pole (the second type of magnetic pole) of the permanent magnet 401a and the other end of the return yoke 402 is in contact with other pole (the first type of magnetic pole) of the permanent magnet 401b.

In the construction of this embodiment, the return yoke 402 serves as a part of the support arm 600 shown in FIG. 6 of the previously described embodiment. Other structures in this embodiment are similar to those in the previous embodiment.

This embodiment also applies a uniform magnetic field to the whole medium, avoiding uneven transfer of a magnetic field at a place of separating the magnetic field generating structure from the medium. Therefore, the transferred signals are prevented from degradation and the magnetic field is applied effectively. Moreover, a cross sectional area of the magnetic field generating structure is made smaller than a conventional one and a load on the support structure for the magnetic field generating structure is reduced, to obtain a small sized magnetic transfer device.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A magnetic transfer device for transferring preformat information carried by a master disk to a magnetic recording layer of a magnetic recording medium by causing close contact between a surface of a transfer information pattern of the master disk and a recording surface of the medium, the transfer information pattern corresponding to the preformat information to be transferred and comprising a ferromagnetic material, and by applying a transfer magnetic field in a direction perpendicular to the surfaces in close contact, the magnetic transfer device comprising:
a magnetic field generating structure for applying the transfer magnetic field to a conjoined body comprising the master disk and the magnetic recording medium, the magnetic field generating structure having a pair of permanent magnets and a return yoke, the pair of permanent magnets being arranged such that respective magnetic poles of different polarity of the permanent magnets are opposing, the return yoke being connected to respective other poles of the permanent magnets;
a device configured to rotate the conjoined body; and
a device configured to move the magnetic field generating structure relative to the conjoined body in a direction of a radius of the conjoined body in a configuration in which
the return yoke is positioned radially more outwardly than the pair of permanent magnets in the direction of the radius of the conjoined body,
the conjoined body is interposed between the opposing magnetic poles of the pair of permanent magnets and the return yoke, and
the magnetic field generating structure is kept at a constant distance from the surfaces in close contact,
wherein an inequality $$Y*60/X \leq M$$

holds,
wherein
M is a length in millimeters in a radial direction of the magnetic field generating structure,
X is a number of rotations of the conjoined body in revolutions per minute, and
Y is a speed of movement of the magnetic field generating structure from an inner periphery to an outer periphery of the conjoined body.

2. A method for magnetic transfer of preformat information to a magnetic recording layer of a magnetic recording medium using the magnetic recording device defined by claim 1, the method comprising:
starting rotation of the conjoined body;
moving the magnetic field generating structure relative to the conjoined body from a position at an outer periphery of the conjoined body to a position at an inner periphery of the conjoined body; and
moving the magnetic field generating structure relative to the conjoined body from the position at the inner periphery of the conjoined body across the conjoined body toward the outer periphery to a position outside of the conjoined body, the moving of the magnetic field generating structure being carried out in a configuration in which
the return yoke is positioned radially more outwardly, in the direction of the radius of the conjoined body, than is the pair of permanent magnets,
the conjoined body is interposed between the opposing magnetic poles of the pair of permanent magnets, and
the magnetic field generating structure is kept at a constant distance from the surface of close contact.

3. The method for magnetic transfer according to claim 2, wherein the second step of moving the magnetic field generating structure includes moving the magnetic field generating structure to interpose the conjoined body between the opposing magnetic poles of the pair of permanent magnets and the return yoke.

4. The magnetic transfer device of claim 1, wherein the magnetic field generating structure has a length less than a radius of the magnetic recording medium.

5. The magnetic transfer device of claim 1, wherein a magnetic flux created by the pair of permanent magnets returns through the return yoke.

6. A method for magnetic transfer of preformat information to a magnetic recording layer of a magnetic recording medium using a magnetic transfer device, the method comprising:
starting rotation of a conjoined body;
moving a magnetic field generating structure relative to the conjoined body from a position at an outer periphery of the conjoined body to a position at an inner periphery of the conjoined body; and
moving the magnetic field generating structure relative to the conjoined body from the position at the inner periphery of the conjoined body across the conjoined body toward the outer periphery to a position outside of the conjoined body, the moving of the magnetic field generating structure being carried out in a configuration in which
a return yoke of the magnetic field generating structure is positioned radially more outwardly, in the direction of a radius of the conjoined body, than is a pair of permanent magnets of the magnetic field generating structure,
the conjoined body is interposed between opposing magnetic poles of the pair of permanent magnets, and
the magnetic field generating structure is kept at a constant distance from a surface of the conjoined body, wherein an inequality $$Y*60/X \leq M$$

holds,
wherein
M is a length in millimeters in a radial direction of the magnetic field generating structure,
X is a number of rotations of the conjoined body in revolutions per minute, and
Y is a speed of movement of the magnetic field generating structure from the inner periphery to the outer periphery of the conjoined body.

7. A magnetic transfer device for transferring information onto a medium, comprising:
a magnetic field generating structure including
a first magnet and a second magnet, and
a support member holding the first magnet and second magnet in a position opposite to each other with the medium interposed therebetween, aligned on an axis perpendicular to the medium, wherein the first magnet and the second magnet each have a length less than a radius of the medium,
wherein the magnetic field generating structure is configured to be moved in a radial direction with respect to the medium, the medium for receiving transferred information by application of a magnetic field generated by the first magnet and the second magnet, starting from a position outside of an outer periphery of the medium, moving radially toward an inner periphery of the medium, and returning to a position outside of the outer periphery of the medium,
wherein an inequality $$Y*60/X \leq M$$

holds,
wherein

M is a length in millimeters in a radial direction of the magnetic field generating structure, X is a number of rotations of the medium in revolutions per minute, and Y is a speed of movement of the magnetic field generating structure from the inner periphery to the outer periphery of the medium.

8. The magnetic transfer device of claim 7, wherein the first magnet and second magnet are connected to a forward part of the support member, and the support member extends from the forward part to a rearward part; and when the magnetic field generating structure is moved in the radial direction with respect to the medium, the forward part is directed radially inward with respect to the medium, and the rearward part is directed radially outward with respect to the medium.

9. The magnetic transfer device of claim 7, wherein the support member is configured to hold the first magnet and the second magnet at a substantially constant distance from the medium.

10. The magnetic transfer device of claim 7, wherein a magnetic flux created by the first magnet and the second magnet returns through the support member.

\* \* \* \* \*